Figure 1:
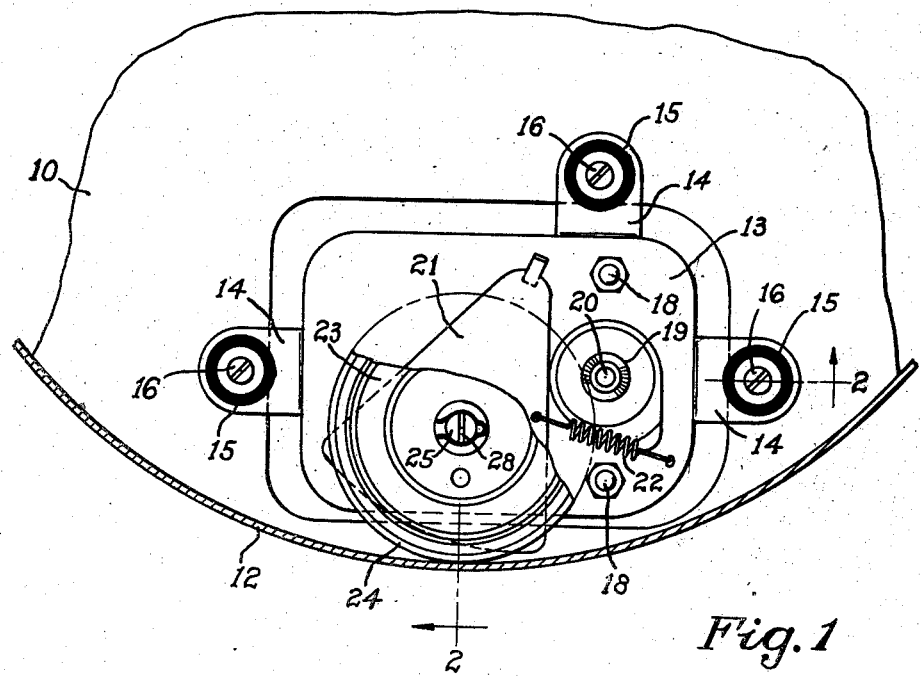

April 6, 1948.  E. V. SCHNEIDER  2,439,026
ADJUSTABLE COMPENSATING TURNTABLE DRIVE
Filed Aug. 3, 1945  3 Sheets-Sheet 1

Inventor
Emmor V. Schneider
By Frease and Bishop
Attorneys

April 6, 1948.  E. V. SCHNEIDER  2,439,026
ADJUSTABLE COMPENSATING TURNTABLE DRIVE
Filed Aug. 3, 1945  3 Sheets-Sheet 2

Inventor
Emmor V. Schneider
By Frease and Bishop
Attorneys

April 6, 1948.  E. V. SCHNEIDER  2,439,026
ADJUSTABLE COMPENSATING TURNTABLE DRIVE
Filed Aug. 3, 1945  3 Sheets-Sheet 3

Inventor
Emmor V. Schneider
By Frease and Bishop
Attorneys

Patented Apr. 6, 1948

2,439,026

UNITED STATES PATENT OFFICE 2,439,026

ADJUSTABLE COMPENSATING TURNTABLE DRIVE

Emmor V. Schneider, Alliance, Ohio, assignor to The Alliance Manufacturing Company, Alliance, Ohio, a corporation of Ohio Application August 3, 1945, Serial No. 608,788

3 Claims. (Cl. 74—193)

The invention relates to an adjustable speed drive for phonograph turntables driven by a motor through an idler wheel, to permit the speed of the turntable to be adjusted to the correct value.

Modern phonographs are conventionally driven by a shaded pole type electric motor equipped with a drive pulley upon its rotor shaft, which frictionally drives an idler wheel which in turn frictionally drives against the inner surface of the turntable rim to rotate the turntable about its spindle.

In the manufacture of these simple and relatively inexpensive motors variations in the speed of the motor occur from unit to unit, due to manufacturing tolerances in the running clearances of the motor, character of the steel from which they are made, the grade of bearing lubrication used, resistance of the rotor, and other causes. In the initial manufacture these variations are compensated for by selecting a suitable size pulley for each motor, but this necessitates stocking a large variety of pulleys for use on these motors and in many cases requires changing of pulleys in the course of manufacture of such motor driven turntable drives.

Furthermore during the ultimate use of the motor in a phonograph additional variations in speed occur. The loss characteristics of the idler wheel drive due to the aging of the rubber tire upon the idler wheel, cause speed variations as do also aging of the lubricant in the bearings of the motor, the idler wheel and the turntable spindle.

The object of the invention is to provide a simple, inexpensive and easily operated adjustable speed drive for idler wheel driven phonograph turntables which will compensate for variations in the course of manufacture.

Another object is to provide an adjustable speed drive for such idler wheel turntable drives which can be quickly and easily adjusted during the life of the phonograph motor to compensate for variations in speed during use.

A further object is to provide a turntable drive system wherein either the drive pulley or the turntable rim is tapered and the position of the idler wheel relative thereto is altered to change the drive ratio of the system.

A still further object is to provide a drive system of this character in which the motor is provided with a tapered driving pulley and the position of the idler wheel is adjusted vertically relative to the pulley.

Still another object is to provide a drive system of this character in which the rim of the turntable is tapered and the position of the idler wheel is adjusted vertically relative thereto.

A further object of the invention is to provide such a drive system in which the motor is pivotally or hingedly mounted and provided with a tapered drive pulley, means being provided for adjusting the motor about its hinge for adjusting the position of the tapered pulley relative to the idler wheel.

Figure 2:
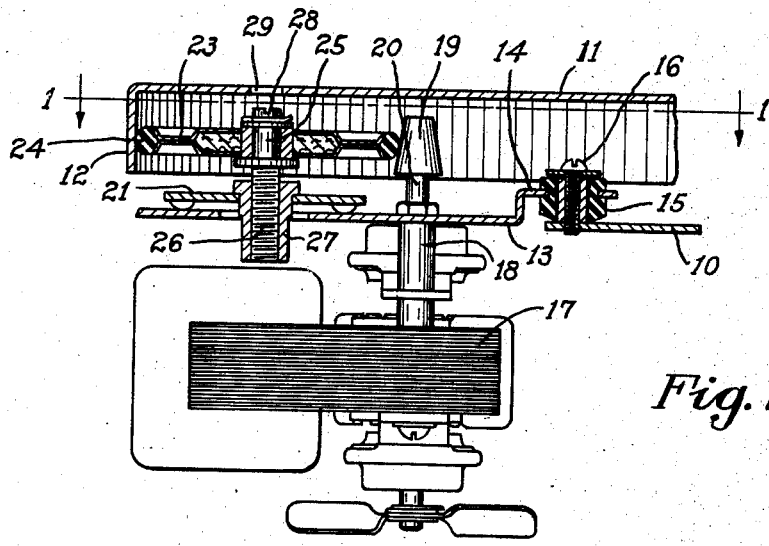
Figure 3:
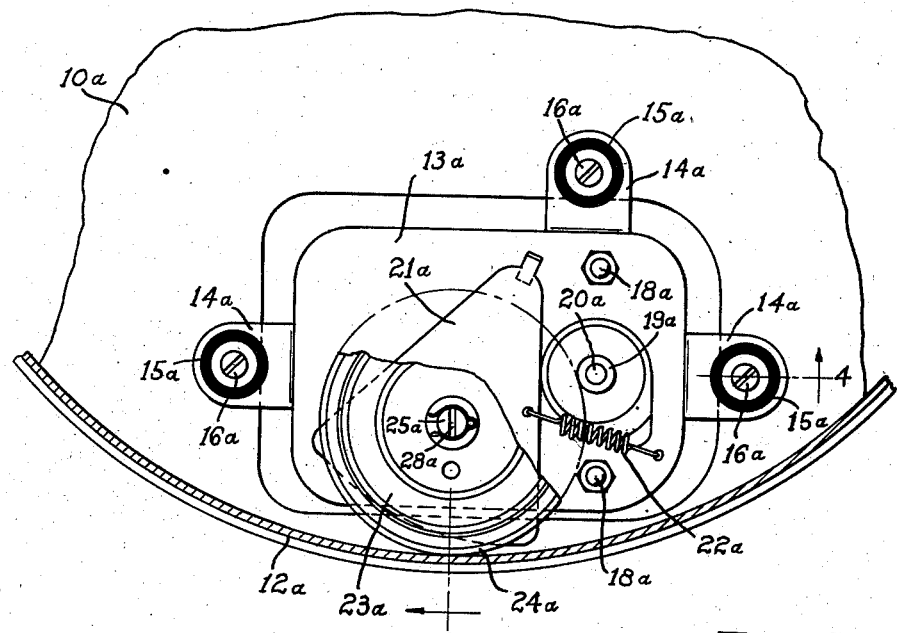
Figure 4:
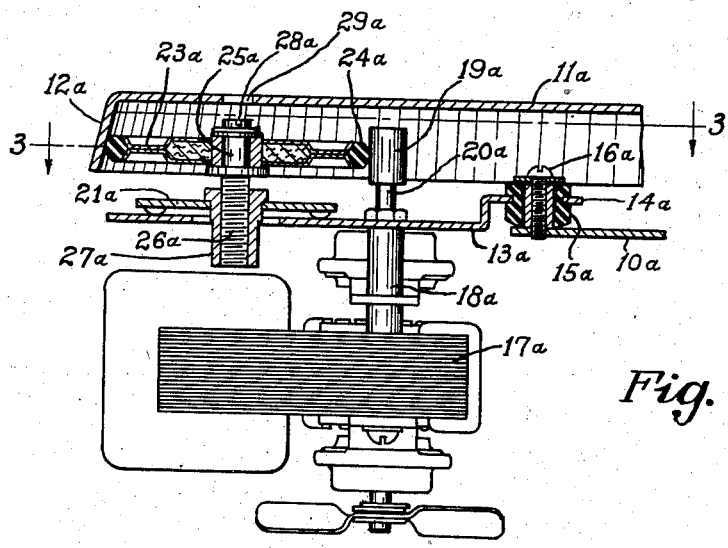
Figure 5:
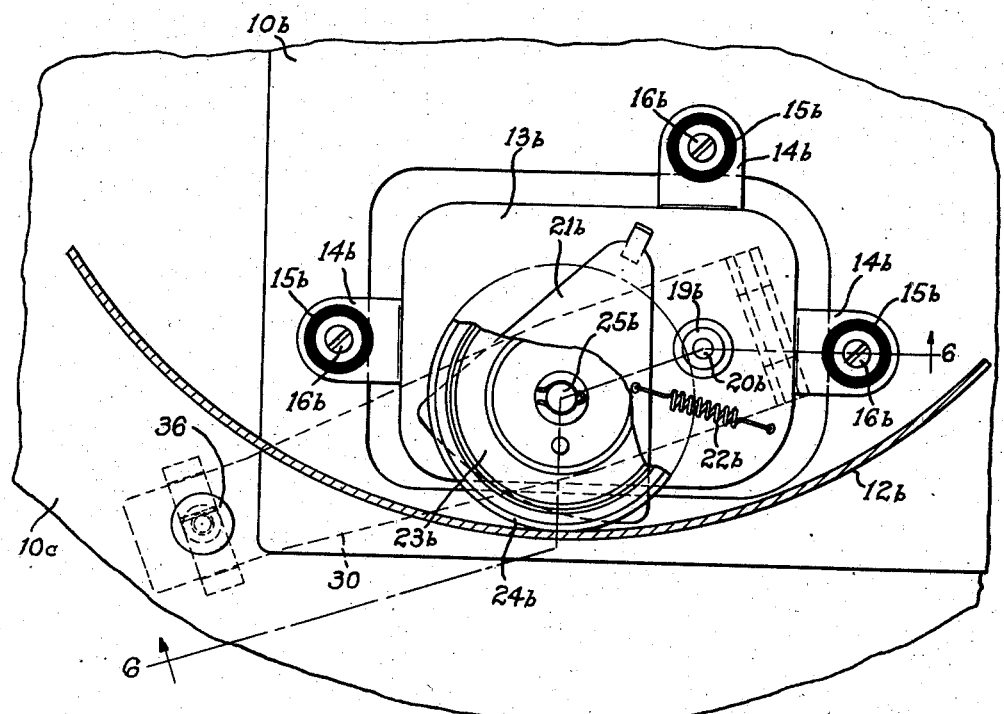
Figure 6:
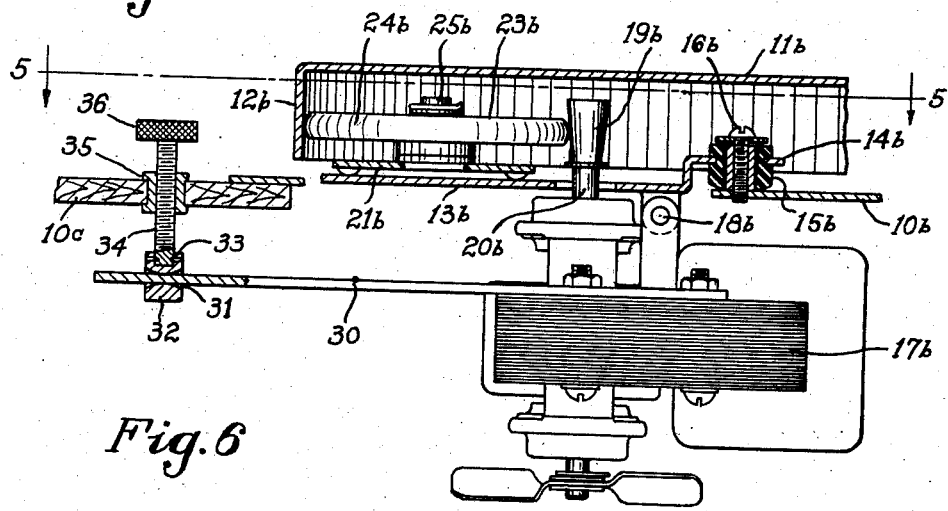

The above objects, together with others which will be apparent from the drawings and following description, or which may be later referred to, may be attained by constructing the improved adjustable compensating turntable drive in the manner hereinafter described and illustrated in the accompanying drawings, in which:

Figure 1 is a fragmentary plan sectional view of an adjustable compensating turntable drive provided with a tapered drive pulley and means for adjusting the idler wheel relative thereto, taken as on the line 1—1, Fig. 2;

Fig. 2 a vertical sectional view through the adjustable compensating turntable drive shown in Fig. 1, taken as on the line 2—2, Fig. 1;

Fig. 3 a plan sectional view of a slightly modified construction of adjustable compensating turntable drive in which the turntable is provided with a tapered rim and the idler wheel is adjustable vertically relative thereto, taken as on the line 3—3, Fig. 4;

Fig. 4 a vertical sectional view taken as on the line 4—4, Fig. 3;

Fig. 5 a plan sectional view of another modification of the adjustable compensating turntable drive in which the motor is pivotally or hingedly mounted and provided with a tapered pulley with means for adjusting the motor around its hinge joint to alternate the position of the tapered pulley relative to the idler wheel, taken as on the line 5—5, Fig. 6, and;

Fig. 6 a vertical sectional view through the adjustable compensating turntable drive shown in Fig. 5, taken as on the line 6—6, Fig. 5.

The improved adjustable compensating turntable drive may be supported directly upon the usual cabinet plate, as in some types of phonograph turntable drives, although it is preferably supported upon a motor mounting plate, supported by rubber grommets or the like upon the cabinet plate as is customary in most types of phonograph turntable drives, and the several forms of the invention illustrated in the accompanying drawings are shown as supported upon such a motor mounting plate.

Referring first to the form of the invention illustrated in Figs. 1 and 2, a portion of the usual cabinet plate is indicated at 10 and the turntable, a portion of which is shown at 11, may be rotatably mounted upon the cabinet plate in any usual and well known manner, the turntable being provided with the depending annular rim flange 12 as in usual practice.

The motor mounting plate 13 is shown resiliently supported upon the cabinet plate by means of the offset ears 14 upon the motor mounting plate and the rubber grommets 15 carried thereby and attached to the cabinet plate as by the screws 16.

The motor, indicated generally at 17 may be a shaded pole type motor of conventional design supported from the motor mounting plate 13, as by the tie bolts 18, as in usual practice, and having an upwardly tapered drive pulley 19 mounted upon the motor shaft 20.

The idler wheel plate 21 may be movably mounted upon the motor mounting plate in any usual and well known manner and provided with the usual spring 22 for normally urging the idler wheel 23, carried thereby, into frictional contact with the drive pulley 19 and turntable rim flange 12 as in ordinary practice.

The idler wheel may be provided with the usual rubber tire 24 for frictional engagement with the driving pulley and turntable rim. The spindle 25 upon which the idler wheel is rotatably mounted is provided with the threaded lower end portion 26 which is screwed into the threaded sleeve 27 mounted upon the idler wheel mounting plate 21 and the upper end of the spindle 25 may be provided with a screw driver slot 28 to which access may be had by a screw driver through the aperture 29, in the turntable for vertically adjusting the idler wheel relative to the tapered drive pulley 19.

It will be seen that as the idler wheel is lowered relative to the tapered drive pulley 19 into contact with the larger end of the drive pulley the speed of the turntable will be increased while raising the idler wheel into contact with the smaller end of the drive pulley will decrease the speed of the turntable. In any adjusted position of the idler wheel the spring 22 will hold the tire thereof in frictional contact with both the drive pulley and turntable rim as in usual practice.

With this construction it will be seen that a simple and inexpensive adjustable speed drive is provided by means of which variations in the course of manufacture may be compensated for by adjusting the idler wheel relative to the tapered drive pulley so that when the phonograph leaves the factory the turntable will rotate at the proper speed.

Furthermore it will be obvious that by adjusting the idler wheel vertically relative to the drive pulley, any variations in speed due to the aging of the rubber tire upon the idler wheel, the aging of lubricants in the bearings and the like may be quickly and easily compensated for.

In Figs. 3 and 4 is shown a slightly modified form of the invention in which all of the parts may be the same as shown in Figs. 1 and 2 and above described with the exception that the drive pulley upon the motor is straight and the rim flange upon the turntable is tapered.

In this form of the invention the usual cabinet plate is indicated at 10a and a portion of the turntable is shown at 11a rotatably mounted upon the cabinet plate in usual and well known manner and provided with the depending, tapered annular rim flange 12a.

The motor mounting plate 13a may be supported upon the cabinet plate 10a by means of the offset ears 14a and rubber grommets 15a carried by said ears and attached to the cabinet plate as by the screws 16a.

The motor is indicated generally at 17a and may be supported from the motor supporting plate 13a as by the tie bolts 18a, as in usual practice, and is provided with the conventional straight driving pulley 19a fixed upon the shaft 20a of the motor.

The idler wheel plate 21a of conventional design, may be movably mounted upon the motor mounting plate in usual and well known manner and provided with the spring 22a for normally urging the idler wheel 23a into frictional contact with the drive pulley 19a and the tapered turntable rim flange 12a.

The usual rubber tire 24a is shown upon the idler wheel for frictional engagement with the drive pulley and turntable rim and the spindle 25a upon which the idler wheel is rotatably mounted is provided with the threaded lower end portion 26a which is screwed into the threaded sleeve 27a fixed upon the idler wheel mounting plate.

The upper end of the spindle 25a is provided with a screw driver slot 28a to which access may be had by a screw driver through the aperture 29a in the turntable for vertically adjusting the idler wheel relative to the tapered turntable rim flange 12a.

In the operation of this form of the invention, as the idler wheel is moved upward into contact with the small diameter of the turntable rim flange the speed of the turntable will be increased while the downward movement of the idler wheel into contact with the larger diameter of the rim flange will produce a decrease in the speed of the turntable.

Thus any variations in speed during manufacture or in the ultimate use of the device may be quickly and easily compensated for by adjusting the idler wheel vertically relative to the tapered rim flange of the turntable.

A somewhat different means of accomplishing the same results is illustrated in the form of the invention shown in Figs. 5 and 6. In this form of the invention the cabinet plate 10b may be mounted upon the platform 10c in usual manner and the turntable 11b is rotatably mounted upon the cabinet plate as in usual practice and provided with the conventional annular rim flange 12b.

The motor mounting plate 13b may be supported upon the cabinet plate by means of ears 14b, rubber grommets 15b and screws 16b. The motor indicated generally at 17b may be a conventional type of shaded pole motor and is suspended from the motor supporting plate as by the pivot or hinge joint 18b around which pivot the motor may be adjusted.

For the purpose of adjusting the motor upon its hinge joint, a lever arm 30 is fixed to the motor and extends outwardly from one side thereof, the end portion of said lever being slidably located through the oppositely tapered opening 31 in the block 32 swiveled as at 33 upon the lower end of the adjusting screw 34, which is threaded through the nut 35 fixed in the platform 10c, said adjusting screw being provided at its upper end with a knurled head 36 by means of which the screw may be easily and readily adjusted vertically within the nut 35 to raise or lower the outer end of the lever 30 and swing the motor around the pivot point 18b.

The drive pulley 19b, mounted upon the motor shaft 20b, is tapered, and as shown in Fig. 6, is preferably tapered downwardly. The idler wheel plate 21b may be of conventional design, movably mounted upon the motor supporting plate 13b and provided with the usual spring 22b by means of which the idler wheel 23b may be normally urged into frictional engagement with the drive pulley 19b and the turntable rim flange 12b.

The usual rubber tire 24b may be mounted around the idler wheel for frictional engagement with the drive pulley and turntable rim, and the idler wheel is rotatably mounted upon the spindle 25b which is carried by the idler wheel mounting plate 21b.

In this form of the invention the tapered drive pulley 19b is adjusted relative to the idler wheel. By lowering the adjusting screw 34 and outer end of the lever 30 the motor 12b is rocked downward and to the left upon its pivot point 18b, as viewed in Fig. 6, moving the upper, larger end of the drive pulley 19b into contact with the idler wheel, while upward movement of the adjusting screw 34 and the outer end of the lever 30 will swing the motor in the other direction around the pivot 18b, moving the smaller end of the drive pulley 19b into contact with the idler wheel and reducing the speed of the turntable.

In this form of the invention the same as in those shown in Figs. 1 and 2, and Figs. 3 and 4, it will be seen that the device may be quickly and easily adjusted for compensating for variations in speed either during the course of manufacture or after the device is in use.

I claim:

1. A transmission including a support, a driving means rotatably mounted upon the support, a peripherally flanged driven means rotatably mounted upon the support, one of said means being tapered, a friction wheel mounting plate laterally movable upon the support, an adjusting screw threaded in the mounting plate, a friction wheel journalled upon the adjusting screw, means holding the friction wheel in contact with the driving means and with the peripheral flange of the driven means, and means for adjusting said screw to change the position of the friction wheel relative to the driving means and the driven means to adjust the speed of the driven means by changing the transmission ratio.

2. A transmission including a support, a tapered driving means rotatably mounted upon the support, a peripherally flanged driven means rotatably mounted upon the support, a friction wheel mounting plate laterally movable upon the support, an adjusting screw threaded in the mounting plate, a friction wheel journalled upon the adjusting screw, means holding the friction wheel in contact with the driving means and with the peripheral flange of the driven means, and means for adjusting said screw to change the position of the friction wheel relative to the driving means and the driven means to adjust the speed of the driven means by changing the transmission ratio.

3. A transmission including a support, a driving means rotatably mounted upon the support, a tapered peripherally flanged driven means rotatably mounted upon the support, a friction wheel mounting plate laterally movable upon the support, an adjusting screw threaded in the mounting plate, a friction wheel journalled upon the adjusting screw, means holding the friction wheel in contact with the driving means and with the peripheral flange of the driven means, and means for adjusting said screw to change the position of the friction wheel relative to the driving means and the driven means to adjust the speed of the driven means by changing the transmission ratio.

EMMOR V. SCHNEIDER.

REFERENCES CITED

The following references are of record in the file of this patent:

UNITED STATES PATENTS

| Number | Name | Date |
|---|---|---|
| 2,254,844 | Guedon | Sept. 2, 1941 |
| 2,381,079 | Pittman, Jr. | Aug. 7, 1945 |